(12) United States Patent
Hall et al.

(10) Patent No.: US 11,441,345 B2
(45) Date of Patent: Sep. 13, 2022

(54) SYSTEM FOR ADJUSTING THE COUNTERBALANCE OF AN OVERHEAD DOOR

(71) Applicant: Hall Labs LLC, Provo, UT (US)

(72) Inventors: David R Hall, Provo, UT (US); Michael Hall, Provo, UT (US); Jerome Miles, Spanish Fork, UT (US); David Groesbeck, Williamson, NY (US)

(73) Assignee: Hall Labs LLC, Provo, UT (US)

( * ) Notice: Subject to any disclaimer, the term of this patent is extended or adjusted under 35 U.S.C. 154(b) by 384 days.

(21) Appl. No.: 16/805,729

(22) Filed: Feb. 29, 2020

(65) Prior Publication Data

US 2021/0270067 A1 Sep. 2, 2021

(51) Int. Cl.
*G01L 5/00* (2006.01)
*E05D 13/00* (2006.01)

(52) U.S. Cl.
CPC ........ *E05D 13/1261* (2013.01); *G01L 5/0057* (2013.01); *G01L 5/0061* (2013.01); *E05Y 2201/492* (2013.01); *E05Y 2900/106* (2013.01); *E05Y 2900/132* (2013.01)

(58) Field of Classification Search
CPC . E05D 13/1261; G01L 5/0057; G01L 5/0061; E05Y 2201/492; E05Y 2900/106; E05Y 2900/132
See application file for complete search history.

(56) References Cited

U.S. PATENT DOCUMENTS

| | | | | |
|---|---|---|---|---|
| 4,981,165 | A * | 1/1991 | Miller | E05D 13/1261 160/191 |
| 5,239,777 | A * | 8/1993 | Husselton | E05D 13/1261 49/506 |
| 5,636,678 | A * | 6/1997 | Carper | E05D 13/1269 16/DIG. 7 |
| 6,134,835 | A * | 10/2000 | Krupke | E05D 13/1261 49/200 |
| 2003/0094248 | A1* | 5/2003 | Mitchell | E05D 13/1261 160/191 |
| 2005/0235563 | A1* | 10/2005 | Mullet | E05D 13/1261 49/200 |

* cited by examiner

*Primary Examiner* — Max H Noori

(57) ABSTRACT

A counterbalance system for an overhead door is disclosed. The system includes a torsion adjustment comprising a first portion and a second portion, the first and second portions being rotatable relative to one another in a first direction and not in a second direction opposite the first direction. The system also includes an anchor fixed to the first portion, a collar fixed to the second portion, the collar being selectively fixable to a shaft of the overhead door, and a spring coupled between the collar and the anchor. The spring supports at least a portion of the weight of the overhead door as the overhead door is raised and lowered. Rotating the first portion of the torsion calibration collar relative to the second portion of the torsion calibration collar increases torsion in the spring and therefore calibrates the spring to support a desired amount of the weight of the overhead door.

20 Claims, 5 Drawing Sheets

SYSTEM FOR ADJUSTING THE COUNTERBALANCE OF AN OVERHEAD DOOR

TECHNICAL FIELD

The present disclosure is directed to apparatuses, systems, and methods for installing an overhead door opener.

BACKGROUND

This invention relates to systems and methods for installing an overhead door opener with a spring to counterbalance the weight of the door. Each door is different, and the spring must be calibrated or the door is too heavy to open, or the spring provides too much lift and the door cannot close. There is a need in the art for an installation mechanism to help calibrate springs for an overhead door.

SUMMARY

Embodiments of the present disclosure are directed to a system for adjusting the counterbalance of an overhead door. The system includes a torsion spring, an anchor adapted to attach to a stationary structure, so that the anchor does not rotate, and a collar attached to and adapted to rotate with a shaft. Rotation of the shaft in one direction raises an overhead door and rotation of the shaft in the opposite direction lowers the overhead door. The torsion spring is pre-loaded with an amount of torsion so as to assist in raising the overhead door. The system also includes a torsion adjustment mechanism coupled to the shaft and comprising a first portion non-rotatably attached to one end of the torsion spring, and a second portion non-rotatably attached to either the anchor or the collar. The first portion and second portion together form a one-way bearing between the first portion and the second portion, which allows relative rotation between the first portion and second portion in one direction, but not in the opposite direction. The amount of torsion pre-loaded in the torsion spring can be increased by rotating the first portion of the torsion adjustment mechanism.

Further embodiments of the present disclosure are directed to a counterbalance system for an overhead door. The system includes a torsion adjustment mechanism comprising a first portion and a second portion, the first and second portions being rotatable relative to one another in a first direction and not in a second direction opposite the first direction. The system also includes an anchor fixed to the first portion, a collar fixed to the second portion, the collar being selectively fixable to a shaft of the overhead door, and a spring coupled between the collar and the anchor. The spring supports at least a portion of the weight of the overhead door as the overhead door is raised and lowered. Rotating the first portion of the torsion adjustment mechanism relative to the second portion of the torsion adjustment mechanism increases torsion in the spring and therefore calibrates the spring to support a desired amount of the weight of the overhead door.

Further embodiments of the present disclosure are directed to a counterbalance system for an overhead door including a counterbalance spring having a first end fixed to an anchor and a second end selectively fixable to a shaft of the overhead door. Rotating the shaft raises and lowers the overhead door. The counterbalance spring urges the overhead door upward. The counterbalance system also includes a torsion adjustment mechanism having a first portion coupled to the anchor and a second portion selectively fixable to the shaft. One of the first or second portions is coupled to the counterbalance spring. Rotating the second portion relative to the first portion in a tightening direction increases tension in the counterbalance spring. The first portion does not rotate relative to the second portion in a loosening direction. The torsion in the spring can be released by releasing the second portion of the torsion adjustment mechanism from the shaft. A torsion measuring unit coupled to the spring and being configured to measure torsion in the counterbalance spring.

Other embodiments of the present disclosure are directed to a method of calibrating a counterbalance spring for an overhead door, including rotating a first portion of a torsion adjustment mechanism relative to a second portion of the torsion adjustment mechanism in a tightening direction to increase tension in a spring coupled to the torsion adjustment mechanism, the spring also being coupled to an anchor and to a shaft of the overhead door. Rotating the shaft raises and lowers the overhead door. The method also includes receiving an indication of torsion from a torsion measuring unit coupled to the spring, and setting the torsion adjustment mechanism with the torsion in the spring within a desired torsion range according to the torsion measuring unit.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the present disclosure. No particular embodiment is intended to define the scope of the invention. Rather, the embodiments provide non-limiting examples of various compositions, and methods that are included within the scope of the claimed inventions. The description is to be read from the perspective of one of ordinary skill in the art.

Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

Figure 1:
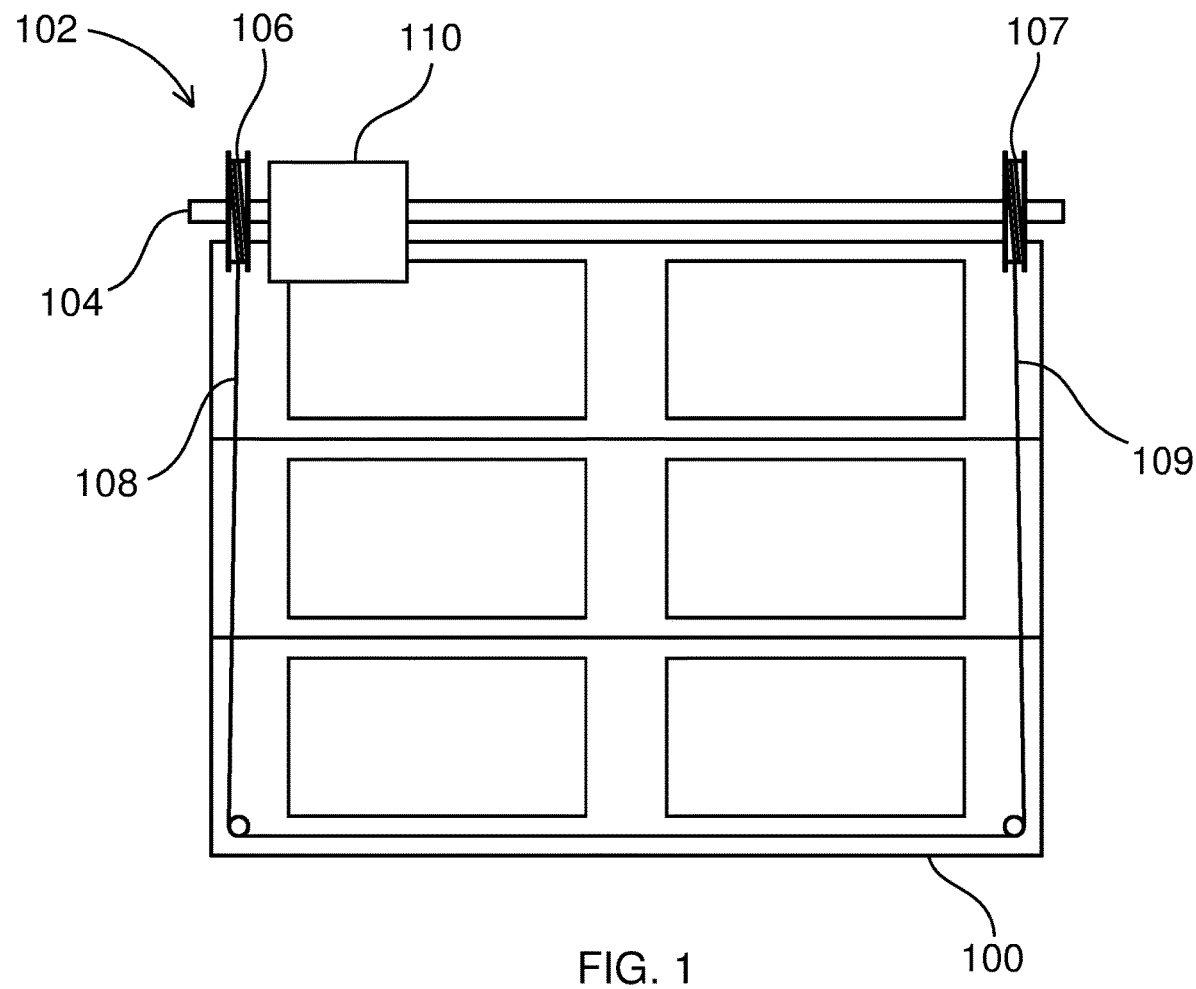
FIG. 1 is a front view of an overhead door according to embodiments of the present disclosure.

FIG. 1 is a front view of an overhead door 100 according to embodiments of the present disclosure. Many homes have overhead doors that are used to enter a garage. Many residential overhead doors are used for automobiles and are opened via a remote control in the car and in the garage to open and close the overhead door. The overhead door 100 of the present disclosure is coupled to an opener 102 which includes a shaft 104, spools 106 and 107 at either end of the shaft 104. Cables 108 and 109 connect to the spools and to the overhead door 100. A motor unit 110 is coupled to the shaft 104 and turns the shaft 104 which turns the spools 106, 107 and winds the cables 108, 109 onto the spools 106, 107 to raise the overhead door 100. The process can be reversed to rotate the shaft 104 in the other direction to unwind the cables 108, 109 from the spools 106, 107 to lower the overhead door 100. In some embodiments the cables are a single cable that extends from one spool 106 to the overhead door 100 and along the lower edge and up to the other spool 107. In other embodiments there can be a single spool on one side of the shaft 104.

Figure 2:
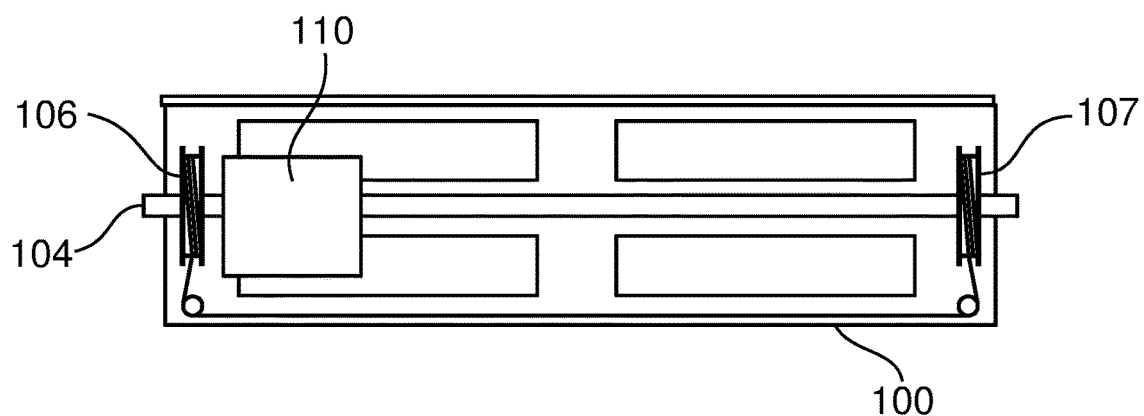
FIG. 2 shows the overhead door of FIG. 1 in a lifted state with the spools wound up and the cables wound up to raise the overhead door according to embodiments of the present disclosure.

FIG. 2 shows the overhead door 100 in a lifted state with the spools 106, 107 wound up and the cables 108, 109 wound up to raise the overhead door 100. The overhead door 100 can be raised and lowered in response to a signal from a remote or a hard-wired control inside the garage or outside the garage.

Figure 3:
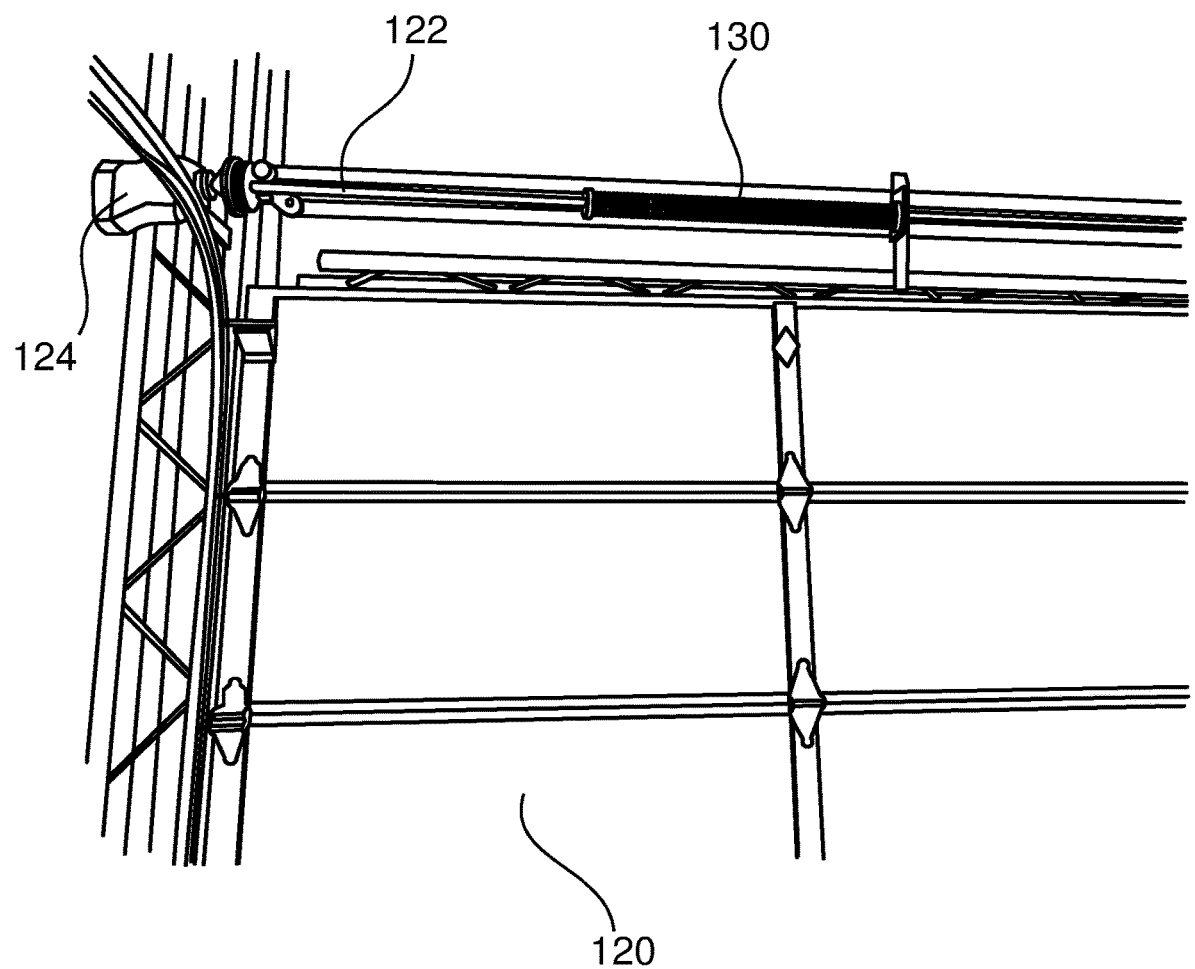
FIG. 3 is a perspective view of an overhead door and spring according to embodiments of the present disclosure.

FIG. 3 is a perspective view of an overhead door 120 and spring 130 according to embodiments of the present disclosure. The overhead door 120 can be coupled to a shaft 122 which is coupled to a motor 124 that turns the shaft 122 to raise and lower the overhead door 120. There are many mechanisms by which an overhead door can be opened and closed that fall within the scope of the present disclosure, such as roller doors, belt-driven doors, shaft-mounted motor doors, panel doors, and others. The spring 130 is coupled to the shaft 122 and is used to counterbalance the weight of the overhead door 120 to lessen the forces required to open and close the overhead door 120 for the motor and for manual operation. In some embodiments the apparatuses, systems, and methods of the present disclosure can be used with a purely manual door that does not use a motor at all.

The spring 130 is wound onto the shaft 122 in the shown embodiment; however, it need not be encircling the shaft as shown here and can be offset from the shaft. For convenience, many such overhead doors employ a coil spring and place the spring 130 around the shaft 122. The spring 130 is loaded with a certain amount of tension that applies a torque to the shaft 122 that tends to rotate the shaft 122 in a direction that would move the overhead door upwards to counterbalance the weight of the door. The amount of weight on the overhead door 120 varies as it moves downward and more and more of the overhead door 120 is in a vertical position. Weight of the door that is in the horizontal position may not be carried by the shaft 122 at all in some cases. The spring 130 is calibrated to account for as much weight of the door as makes the overhead door 120 easy to lift by hand, and to consume less power when operated by a motor. If the spring 130 is wound too tightly it provides too much upward force and the overhead door 120 is difficult to close. If the spring 130 is wound too loosely the spring 130 does not carry enough of the weight and the overhead door 120 is too heavy to lift by hand. Calibrating the spring 130 can be difficult and often is done without any measuring equipment and therefore relies on the expertise of the installer.

Figure 4:
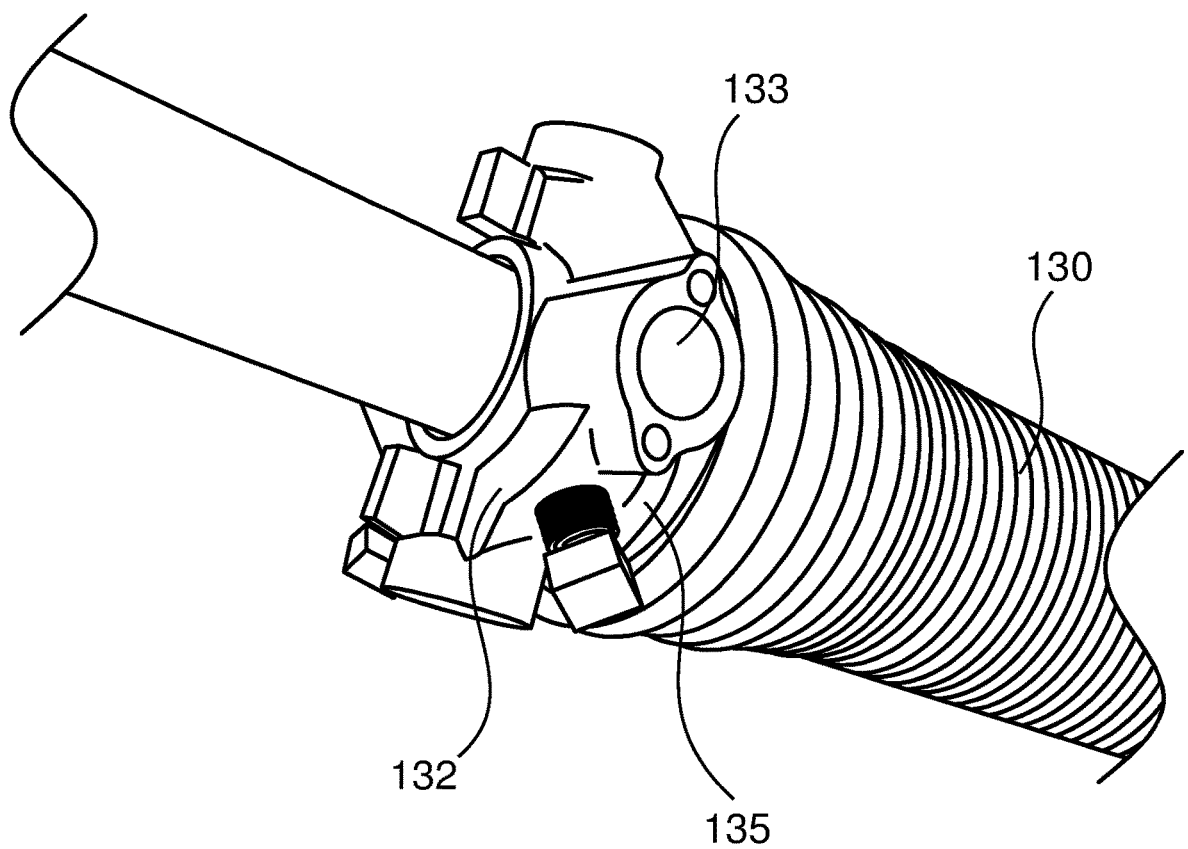
FIG. 4 is a perspective view of a collar for use with a spring according to embodiments of the present disclosure.

FIG. 4 is a perspective view of a collar 132 for use with a spring 130 according to embodiments of the present disclosure. The collar 132 is placed onto the shaft 122 and holds the spring 130 in place relative to the shaft. Movement of the collar 132 determines how much torsion is in the spring 130. The collar 132 can have holes 133 that can receive a lever (not shown) or a wrench to rotate the collar 132. The lever gives the leverage needed to apply torsion to the spring 130. The collar 132 also includes set screws 135 that are threaded into the collar 132 and penetrate the collar 132 and can be screwed onto and even slightly into the shaft 122 to secure the collar 132 to the shaft 122. The set screws 135 can be loosened to release the collar 132 and the tension in the spring 130 if during calibration the torsion in the spring 130 is set too high.

Conventional systems without the benefit of the present disclosure have required the installer to hold the weight of the overhead door 120 and spring 130 in one hand while turning the set screws 135 to secure the collar 132 to the shaft 122. Or two installers were required. Moreover, there is no reliable way for the installer to be sure the torsion is within an acceptable range, and with both hands very busy holding the weight of the overhead door 120 and the torsion in the spring 130, an installer had no free hands to take, read, and apply any such measurement.

Figure 5:
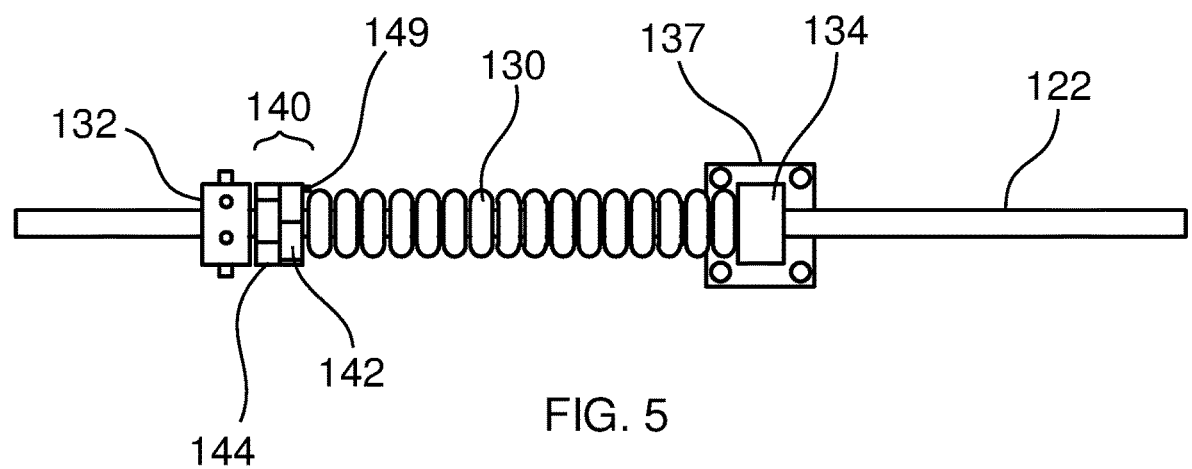
FIG. 5 shows a torsion calibration collar for use with a shaft of an overhead door according to embodiments of the present disclosure.

FIG. 5 shows a torsion calibration torsion adjustment mechanism 140 for use with a shaft of an overhead door according to embodiments of the present disclosure. The torsion calibration torsion adjustment mechanism 140 can also be referred to as a torsion adjustment mechanism 140. An anchor 134 is mounted to a wall near the overhead door or any suitably rigid surface such as a pillar, a joist, or virtually any stationary part of the structure in which the overhead door is deployed. The anchor 134 may include a bearing that encircles a portion of the shaft 122. The anchor 134 is coupled to the spring 130 at one end of the spring 130 and is anchored to a wall or other stationary foundation. The anchor 134 can be mounted to a backplate 137 to further strengthen the support provided by the anchor 134. The anchor 134 is not coupled to the shaft 122 and allows the shaft 122 to rotate within the anchor 134. The anchor 134 is fixed to the end of the spring 130 and does not allow the end of the spring 130 to rotate relative to the anchor 134.

The torsion adjustment mechanism 140 may be placed onto the shaft 122 at an opposite end of the spring 130 opposite the anchor 134. In other embodiments the torsion adjustment mechanism 140 does not encircle the shaft 122 or provide a bearing surface for the shaft 122. There is a collar 132 opposite the anchor 134 that is coupled to the spring 130 and can be selectively fixed to the shaft 122. The collar 132 can include set screws 135 that penetrate the collar 132 and grasp the shaft 122 to prevent the shaft 122 from rotating relative to the collar 132 as is shown in FIG. 4.

The torsion adjustment mechanism 140 comprises a first portion 142 and a second portion 144 that can rotate relative to one another in one direction but resist such rotation in a second direction opposite the first direction. The torsion adjustment mechanism 140 can therefore serve as a one-way bearing. The torsion adjustment mechanism 140 is allowed to rotate in a direction that tightens the spring 130 and is prevented from rotating in an opposite direction that would loosen the spring. The first portion 142 can include a hexagonal outer profile, or holes similar to collar 132 to allow the installer to easily turn the first portion 142. The first portion 142 is fixedly coupled to the spring 130 and the second portion 144 is coupled to the collar 132. In some embodiments the first portion 142 and second portion 144 are ratcheted to permit movement in the first direction and to prevent movement in the second direction. In other embodiments the first torsion adjustment mechanism 140 is a needle bearing or a Sprag bearing that offer continuous or near continuous adjustment.

The torsion adjustment mechanism 140 may be lockable to prevent further movement of the first portion 142 relative to the second portion 144. When locked, the torsion adjustment mechanism 140 is effectively a rigid member and the torsion in the spring 130 is set. The lock can be a screw 149 that penetrates the first portion 142 and prevents rotation relative to the second portion 144.

In some embodiments the anchor 134 is omitted and the spring 130 is mounted directly to the wall. In some embodiments the collar 132 is omitted and the second portion 144 of the torsion adjustment mechanism 140 can be selectively fixed to the shaft 122. The one-way bearing provided by the torsion adjustment mechanism 140 can be considered a dividing point between anchor-side components and shaft-side components. The anchor-side components can include the first portion 142 of the collar, the spring 130 (or a portion of the spring 130). The spring 130 may be mounted directly to the wall, or an anchor 134 can be used. The shaft-side components can include the second portion 144 of the spring 130 (or a portion of the spring 130) which can be selectively fixed to the shaft 122, and optionally a collar 132.

Figure 6:
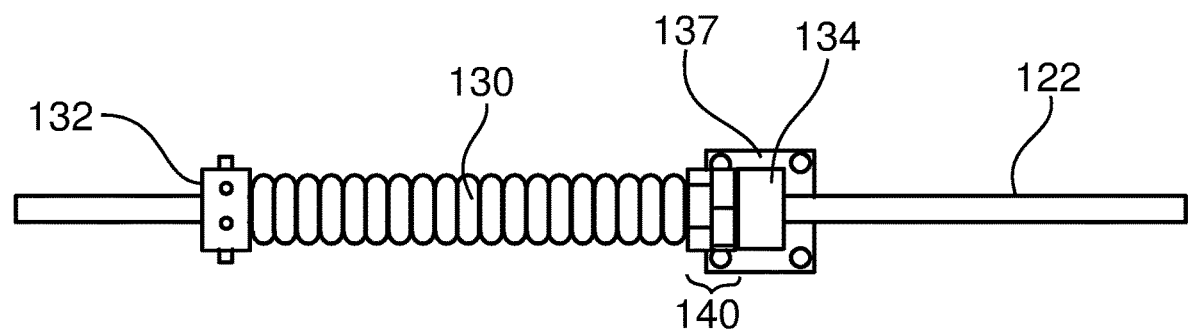
FIG. 6 shows another embodiment showing relative positions of the torsion adjustment mechanism, collar, and anchor according to the present disclosure.

FIG. 6 shows another embodiment showing relative positions of the torsion adjustment mechanism, collar, and anchor according to the present disclosure. Viewing from right to left, the components are: anchor 134, torsion adjustment mechanism 140, spring 130, and collar 132. In some embodiments the collar 132 and or anchor 134 can be omitted and the torsion adjustment mechanism or spring can be fixed to the shaft or wall respectively. The torsion adjustment mechanism 140 operates in a generally similar manner when mounted this way.

Figure 7:
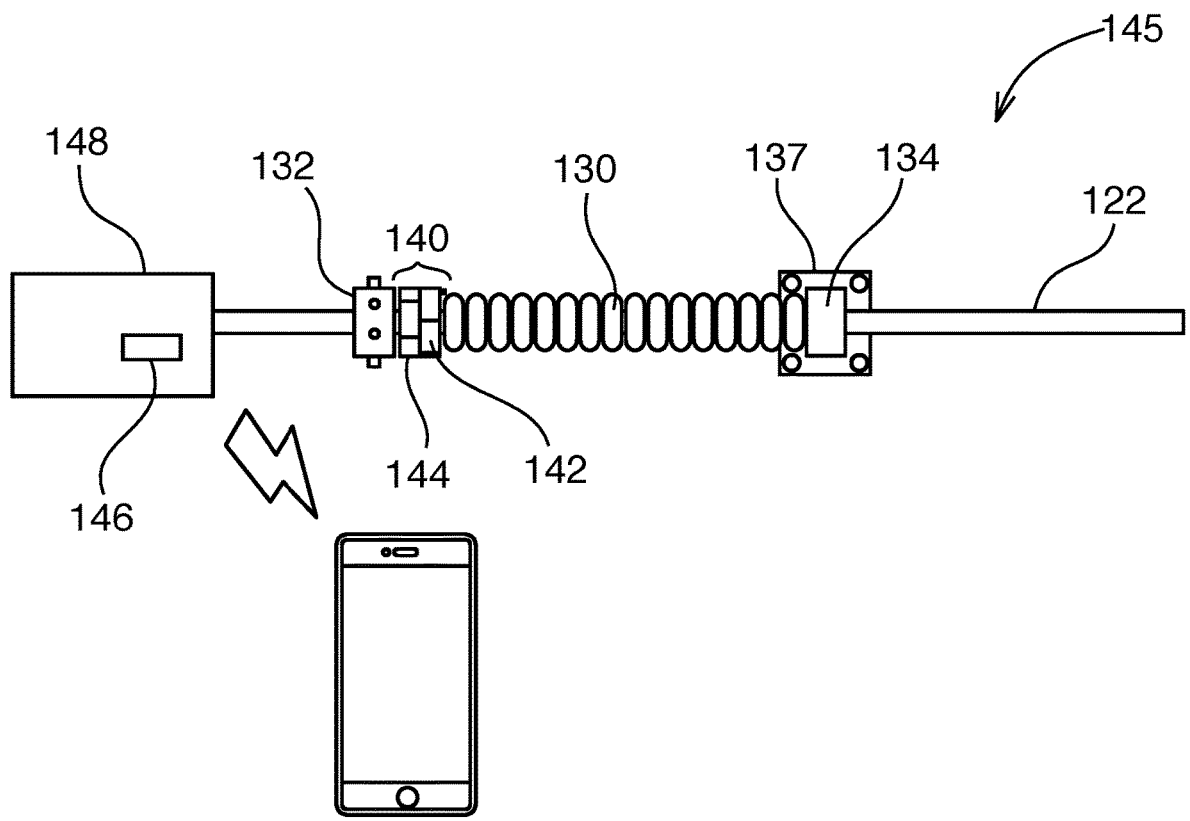
FIG. 7 shows a system for setting a tension in a spring for an overhead door according to embodiments of the present disclosure.

To install the torsion calibration torsion adjustment mechanism 140 a technician secures the collar 132, torsion adjustment mechanism 140, spring 130, and anchor 134 to the shaft 122 in the order and relationship shown in FIG. 5, 6, or 7. The technician can then adjust the torsion in the spring 130 by rotating the first portion 142 relative to the second portion 144. The one-way bearing action in the torsion adjustment mechanism 140 holds the tension so the technician does not need to do so. The torsion adjustment mechanism 140 will hold at any given position within the limits of the spring 130 without.

If the first portion 142 is rotated too far, the collar 132 can be released by loosening the set screws 135 to relieve the torsion and can then be reattached to the shaft 122 and calibration can be attempted again. Accordingly, the technician can easily and reliably achieve a desired tension in a spring 130 for counter-balancing the overhead door.

FIG. 7 shows a system 145 for setting a tension in a spring for an overhead door according to embodiments of the present disclosure. The system 145 includes a shaft 122 and spring 130 of an overhead door and a torsion sensing unit 146 according to embodiments of the present disclosure. The torsion sensing unit 146 can be built into a motor 148 that turns the shaft 122 to raise and lower the overhead door 120, or it can be a stand-alone unit. The system 145 can include a remote device such as a smartphone 150 that communicates with the torsion sensing unit 146 wirelessly using Bluetooth, Wi-Fi, or any other suitable communication protocol. The installer can hold the smartphone 150 while turning the torsion adjustment mechanism 140. The torsion sensing unit 146 can provide a reading of the torsion in the spring 130 and can know what a proper torsion can be. The installer therefore needs no expertise to reach the desired range of torsion; rather, the system 145 tells exactly when to stop to reach a desired torsion range. In some embodiments the torsion measuring unit can also weigh the overhead door and derive the desired torsion range from the weight. The overhead door can be moved up and down and the torsion measuring unit can measure the weight along the path of the door which will be heaviest when the overhead door is fully down just before resting on the ground, and lightest when the overhead door is in the fully retracted overhead position as shown in FIG. 2. The torsion in the spring 130 can be calibrated to halfway between these extremes. Accordingly, the system 145 is less error-prone, difficult, and dangerous than previous systems.

The foregoing disclosure hereby enables a person of ordinary skill in the art to make and use the disclosed systems without undue experimentation. Certain examples are given to for purposes of explanation and are not given in a limiting manner. All patents and published patent applications referred to herein are incorporated herein by reference.

The invention claimed is:

1. A system for adjusting the counterbalance of an overhead door, comprising:
   a torsion spring;
   an anchor adapted to attach to a stationary structure, so that the anchor does not rotate;
   a collar attached to and adapted to rotate with a shaft, wherein rotation of the shaft in one direction raises an overhead door and rotation of the shaft in the opposite direction lowers the overhead door and wherein the torsion spring is pre-loaded with an amount of torsion so as to assist in raising the overhead door;
   a torsion adjustment mechanism coupled to the shaft and comprising:
      a first portion non-rotatably attached to one end of the torsion spring;
      a second portion non-rotatably attached to either the anchor or the collar, wherein the first portion and second portion together form a one-way bearing between the first portion and the second portion, which allows relative rotation between the first portion and second portion in one direction, but not in the opposite direction;

whereby the amount of torsion pre-loaded in the torsion spring can be increased by rotating the first portion of the torsion adjustment mechanism.

2. The system of claim 1 wherein the spring is coupled to the anchor and to the first portion of the torsion adjustment mechanism.

3. The system of claim 1 wherein the spring is coupled to the collar and to the second portion of the torsion adjustment mechanism.

4. The system of claim 1 wherein the collar is releasably attached to the shaft, wherein releasing the collar releases the torsion in the spring.

5. The system of claim 1 wherein the collar and the second portion of the torsion adjustment mechanism are integral.

6. The system of claim 1, further comprising:
a torsion sensing unit coupled to the shaft and configured to measure an amount of torsion in the spring; and
a computing device in communication with the torsion sensing unit and being configured to receive a readout of torsion in the spring, wherein the computing device stores information describing a desired torsion range, and wherein the computing device is configured to display to a user when torsion in the spring reaches the desired torsion range.

7. The system of claim 1 wherein at least one of the torsion adjustment mechanism, the anchor, the spring, and the collar encircles a portion of the shaft.

8. The system of claim 1, further comprising set screws in the collar that can be turned to grasp the collar to the shaft.

9. The system of claim 1 wherein the torsion adjustment mechanism comprises at least one of a ratchet, a needle bearing, or a Sprag bearing.

10. A counterbalance system for an overhead door, comprising:
a counterbalance spring having a first end fixed to an anchor and a second end selectively fixable to a shaft of the overhead door, wherein rotating the shaft raises and lowers the overhead door and wherein the counterbalance spring urges the overhead door upward;
a torsion adjustment mechanism having a first portion coupled to the anchor and a second portion selectively fixable to the shaft; and
a torsion measuring unit coupled to the spring and being configured to measure torsion in the counterbalance spring, wherein:
one of the first or second portions of the torsion adjustment mechanism is coupled to the counterbalance spring;
rotating the second portion of the torsion adjustment mechanism relative to the first portion of the torsion adjustment mechanism in a tightening direction increases tension in the counterbalance spring;
the first portion of the torsion adjustment mechanism does not rotate relative to the second portion of the torsion adjustment mechanism in a loosening direction;
the torsion in the spring can be released by releasing the second portion of the torsion adjustment mechanism from the shaft.

11. The counterbalance system of claim 10, further comprising a device configured to store a desired torsion range and to receive an indication from the torsion measuring unit of whether or not the torsion in the counterbalance spring is within the desired torsion range.

12. The counterbalance system of claim 11 wherein the torsion measuring unit is further configured to weigh the overhead door and derive the desired torsion range from the weight.

13. The counterbalance system of claim 10 wherein the counterbalance spring is fixed to the anchor and to the first portion of the torsion calibration collar.

14. The counterbalance system of claim 10, further comprising a collar selectively fixable to the shaft and wherein the counterbalance spring is coupled between the collar and the second portion of the torsion calibration collar.

15. A method of calibrating a counterbalance spring for an overhead door, the method comprising:
rotating a first portion of a torsion adjustment mechanism relative to a second portion of the torsion adjustment mechanism in a tightening direction to increase tension in a spring coupled to the torsion calibration collar, the spring also being coupled to an anchor and to a shaft of the overhead door, wherein rotating the shaft raises and lowers the overhead door;
receiving an indication of torsion from a torsion measuring unit coupled to the spring; and
setting the torsion adjustment mechanism with the torsion in the spring within a desired torsion range according to the torsion measuring unit.

16. The method of claim 15, further comprising locking the torsion adjustment mechanism by locking the first portion to the second portion.

17. The method of claim 15 wherein receiving the indication comprises receiving data at a remote device.

18. The method of claim 15, further comprising releasing torsion in the spring by releasing the torsion adjustment mechanism from the anchor.

19. The method of claim 15, further comprising releasing torsion in the spring by releasing the torsion adjustment mechanism from the shaft.

20. The method of claim 15, further comprising monitoring torsion after setting the torsion adjustment mechanism and issuing an alarm if the torsion in the spring falls outside of the desired torsion range.

* * * * *